United States Patent
Greif et al.

(10) Patent No.: US 6,728,120 B1
(45) Date of Patent: Apr. 27, 2004

(54) RECTIFIER APPARATUS FOR HIGH VOLTAGES

(75) Inventors: Tomas Greif, Roettenbach (DE); Matthias Spitz, Aurachtal (DE)

(73) Assignee: Siemens Aktiengesellschaft (DE)

(*) Notice: Subject to any disclaimer, the term of this patent is extended or adjusted under 35 U.S.C. 154(b) by 39 days.

(21) Appl. No.: 10/009,811

(22) PCT Filed: Jun. 7, 2000

(86) PCT No.: PCT/DE00/01847
§ 371 (c)(1),
(2), (4) Date: Mar. 29, 2002

(87) PCT Pub. No.: WO00/77917
PCT Pub. Date: Dec. 21, 2000

(30) Foreign Application Priority Data

Jun. 14, 1999 (DE) ......................... 199 26 979

(51) Int. Cl.⁷ .............................................. H02M 1/12
(52) U.S. Cl. ................................................... 363/40
(58) Field of Search ..................... 363/39, 40; 323/205, 323/207

(56) References Cited

U.S. PATENT DOCUMENTS

| 5,155,671 A | 10/1992 | Inaba et al. ................ 363/37 |
| 5,446,643 A | 8/1995 | McMurray ................... 363/40 |
| 5,469,041 A | * 11/1995 | Bourgeois .................. 318/810 |
| 5,485,075 A | * 1/1996 | Mori et al. .................. 323/207 |
| 5,835,364 A | 11/1998 | DeWinter et al. ............ 363/45 |
| 5,933,331 A | * 8/1999 | Boldin et al. ................ 363/16 |
| 5,969,959 A | * 10/1999 | Odegard et al. ............. 363/51 |
| 6,049,195 A | 4/2000 | Geis et al. .................. 322/46 |

FOREIGN PATENT DOCUMENTS

| DE | 19636094 | 11/1997 |
| EP | 0899861 | 3/1999 |
| EP | 0913918 | 5/1999 |
| JP | 10108474 | 4/1998 |
| JP | 11136954 | 5/1999 |

OTHER PUBLICATIONS

Jie Zhang, "High Performance Control of a Three–Level IGBT Inverter fed AC Drive", IEEE, pp22–28, Oct. 1995.
A. Ch. Rufer, "An aid in the teaching of multilevel inverters for high power applications", IEEE, p347–352, Jun. 1995.
German article , "Kompakt: drehzahlveranderbare Mittel-spannungsantriebe", Heft 20, pp. 10–12, 1998.
German article, "Innovation im Bereich Mittelspannung-santriebe", Heft 1–2, p. 8, 1998.

* cited by examiner

Primary Examiner—Adolf D. Berhane
(74) Attorney, Agent, or Firm—Baker Botts LLP

(57) ABSTRACT

The invention relates to a voltage intermediate circuit converter having a 12-pulse input converter (2), having a voltage intermediate circuit (12) and having a machine converter (14) using three-point switching. According to the invention, the two converter elements (4, 6) of the input converter (2) have a respective self-commutated pulse-controlled converter ($4_1$, $6_1$). An input converter (2) is thus obtained, which links the advantages of a diode front end and an active front end with one another.

6 Claims, 4 Drawing Sheets

RECTIFIER APPARATUS FOR HIGH VOLTAGES

FIELD OF THE INVENTION

The invention relates to a voltage intermediate circuit converter having a 12-pulse input converter, a voltage intermediate circuit and a machine converter using three-point switching.

BACKGROUND OF THE INVENTION

A converter of the type described above is disclosed in the German magazine "etz", Issue 20, 1998, pages 10 to 12. This voltage intermediate circuit converter has, in its standard version, a 12-pulse diode rectifier, wherein the diode rectifier elements are each connected to a secondary winding of a three-winding transformer. On the DC-side, the diode rectifier elements are each linked to a capacitor in a voltage intermediate circuit, which has two capacitors which are connected electrically in series. Such an input converter is referred to as a diode front end (DFE). In most cases, such a diode front end satisfies the requirements for the mains system power factor and harmonic content. If mains feedback effects are subject to more stringent requirements, then a 24-pulse input converter is available.

A voltage intermediate circuit converter which has a self-commutated pulse-controlled converter as the input converter is described in the German magazine "Engineering and automation", Issue 1–2, 1998, pages 8 and 9. Like the machine-side pulse-controlled converter, this input converter is in the form of a three-point pulse-controlled converter. The voltage intermediate circuit is formed by two capacitors which are electrically connected in series. This input converter circuit option is also referred to as an active front end (AFE). An active front end allows four-quadrant operation (driving and regenerative braking in both rotation directions). This active input converter not only allows a power factor of cos φ=1 to be achieved, but also allows the wattless component of other loads to be compensated for in the mains system, at least as far as power margins are concerned. If the active front end is equipped with an input filter, virtually harmonic-free operation from the mains system is also possible.

A diode front end has the disadvantage that four-quadrant operation is not possible without further complexity. The additional complexity is that a break chopper is required for generator operation, by means of which the generated energy is converted into heat in a breaking resistance. The use of 12-pulse and 24-pulse diode front ends means that 5th, 7th, 11th and 13th harmonics, and 5th, 7th, 13th, 23rd and 25th harmonics, respectively, are suppressed. In the 24-pulse embodiment of the diode front end, the complexity on the input side is twice that of the 12-pulse embodiment of the diode front end, which means that it is not just the space requirement that increases.

An active front end has the disadvantage that the 5th, 7th, 11th and 13th, etc. harmonics occur, depending on the number of pulses, the amplitudes of which can at least be minimized by means of an optimized pulse pattern. Furthermore, the active front end is more complex than a diode front end owing to the number and configuration of the components. Since, in design terms, the active front end corresponds to the machine-side self-commutated pulse-controlled converter, a voltage intermediate circuit converter with an active front end occupies a larger amount of space than a voltage intermediate circuit converter with a 12-pulse diode front end.

SUMMARY OF THE INVENTION

The present invention is based on the object of specifying a voltage intermediate circuit converter having an input converter designed so that the harmonics which occur on the mains system side are kept as low as possible, and with minimal complexity.

Since the converter elements of the 12-pulse input converter are each self-commutated pulse-controlled converters, the advantages of a diode front end are combined with those of an active front end. This means that the harmonic currents of the 5th, 7th, 17th and 19th harmonics are suppressed on the mains system side of the voltage intermediate circuit converter without the optimized pulse patterns of the self-commutated pulse-controlled converters being optimized to these harmonics. Since the two converter elements are in the same operating state, their pulse patterns are the same. This optimized pulse pattern can now be optimized such that the amplitudes of the harmonic currents of the 11th, 13th, 25th, etc. harmonics are minimized.

A further advantage of this input converter according to the present invention is evident at very high voltages. The converters for standard medium voltages have two or more active converter devices connected in series for a voltage value above 3.3 kV. Since the input converter according to the invention has two identical self-commutated pulse-controlled converters, which are connected electrically in series, the number of converter elements connected in series is equal to or one less than the number of machine converters connected in series. With the standard medium voltage of 4.16 kV, the input converter of a voltage intermediate circuit converter according to the invention has precisely the same number of active converter devices as an input converter in the active front end configuration. Low blocking-capability semiconductor switches, which can be operated at a higher switching frequency or can be used at higher current levels, can be used as the active conductor devices, with precisely the same number connected in series. The design of the phase modules is both simple and space-saving, with the number of items connected in series being reduced by one.

BRIEF DESCRIPTION OF THE DRAWING

The present invention is described in greater detail in connection with the drawings which schematically show an embodiment of the input converter, and in which.

DETAILED DESCRIPTION OF THE INVENTION

Figure 1:
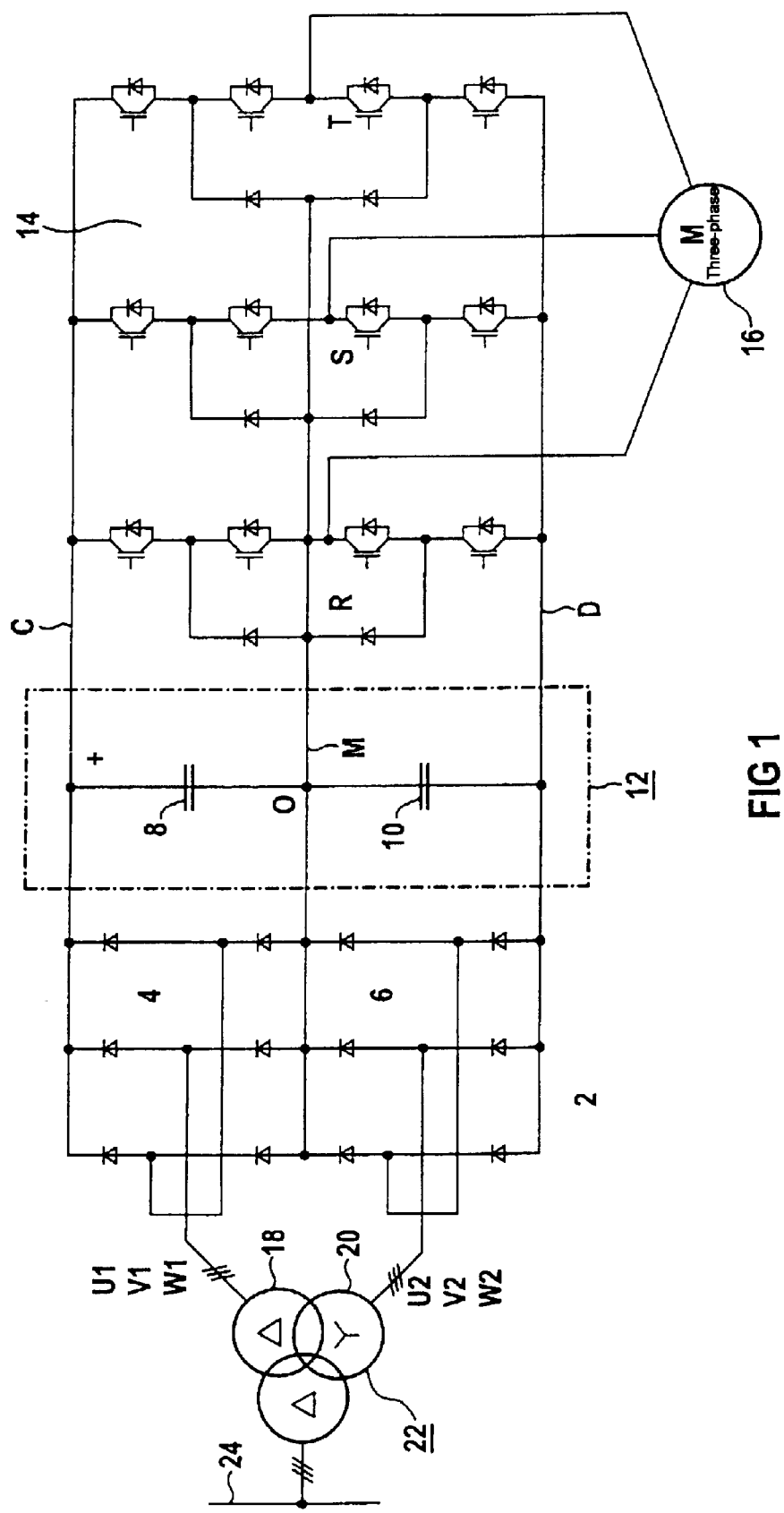
FIG. 1 illustrates a block diagram of a standard version of a voltage intermediate converter.

FIG. 1 shows a block diagram of a standard version of a voltage intermediate circuit converter of a generic type with a 12-pulse input converter 2. The two converter elements 4 and 6 of this input converter 2 are each 6-pulse diode rectifiers. Each converter element 4 or 6 is linked on the DC-side to a respective capacitor 8 or 10 in a voltage intermediate circuit 12. Since these two capacitors 8 and 10 are connected electrically in series, this voltage intermediate circuit 12 has three potentials C, M and D. Furthermore, this voltage intermediate circuit converter has a machine converter 14 with the AC-side outputs R, S, T being connected to a three-phase machine 16. On the DC-side, the machine converter 14 is electrically conductively connected to the three potentials C, M and D of the voltage intermediate circuit 12. High-voltage insulated gate bipolar transistors (HV-IGBTs) are provided as active converter devices for the machine converter 14. The machine converter 14 uses three-point switching. The converter elements 4 and 6 of the input converter 2 are electrically conductively connected on the AC-side to a secondary winding 18 or 20 of a three-winding transformer 22. On the primary side, this three-winding transformer 22 is linked to a three-phase mains system 24.

Figure 2:
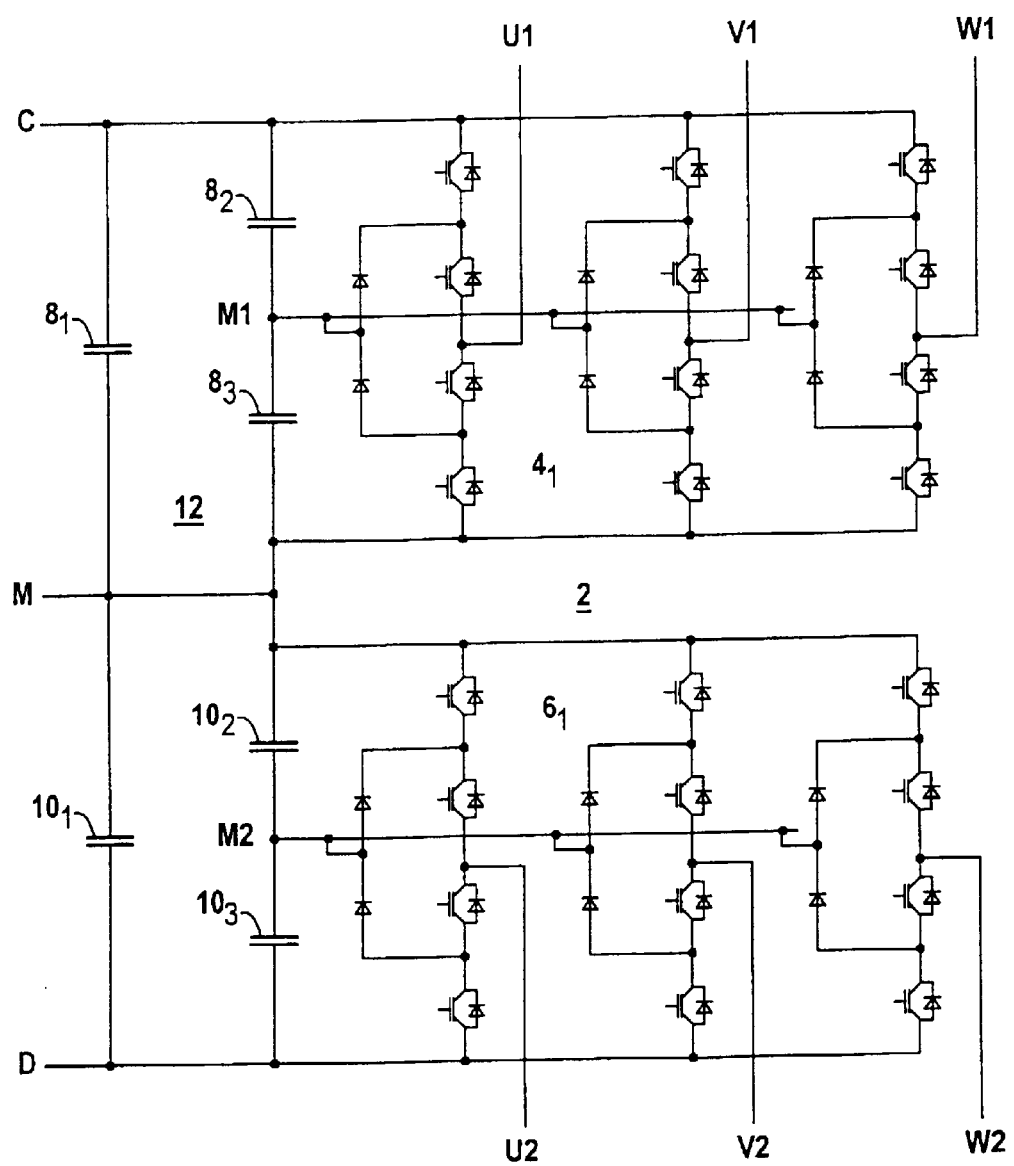
FIG. 2 illustrates a block diagram of an input converter according to the invention for a voltage intermediate circuit converter as shown in FIG. 1.

FIG. 2 shows a block diagram of an embodiment of the input converter 2 of the present invention. This input converter 2 has respective self-commutated pulse-controlled converters $4_1$ and $6_1$ as the converter elements 4 and 6, respectively. These two pulse-controlled converters $4_1$ and $6_1$ use three-point switching in the same way as the machine-side three-point pulse-controlled converter 14, with HV-IGBTs likewise being used as the active converter devices. On the AC-side, the connections U1, V1, W1 of the self-commutated pulse-controlled converter $4_1$ are linked to the secondary winding 18 of the three-winding transformer 22. On the AC-side, the connections U2, V2, W2 of the self-commutated pulse-controlled converter $6_1$ are connected to the secondary winding 20 of the three-winding transformer 22.

FIG. 2 also shows the voltage intermediate circuit 12 in more detail. The two capacitors 8 and 10 of this voltage intermediate circuit 12 are each subdivided into three capacitor elements $8_1$, $8_2$, $8_3$ and $10_1$, $10_2$, $10_3$. In this case, the two capacitor elements $8_2$, $8_3$ and $10_2$, $10_3$ are connected electrically in series, and this series circuit is then connected electrically in parallel with the respective capacitors $8_1$ and $10_1$. The junction point between the two series-connected capacitors $8_2$, $8_3$ and $10_2$, $10_3$ form a medium-voltage potential M1 or M2, respectively, for the respective three-point pulse-controlled converters $4_1$ and $6_1$. These two series circuits of capacitor elements $8_2$, $8_3$ and $10_2$, $10_3$ are also connected electrically in series. The junction point between these two series circuits is connected to the central voltage M of the voltage intermediate circuit 12. Since the capacitors 8 and 10 in the voltage intermediate circuit 12 are each subdivided into a number of capacitor elements $8_1$, $8_2$, $8_3$ and $10_1$, $10_2$, $10_3$, the capacitor elements $8_1$ and $10_1$ can be physically associated with the machine converter 14, and the capacitor elements $8_2$, $8_3$ and $10_2$, $10_3$ can be physically associated with the self-commutated pulse-controlled converter $4_1$, $6_1$ in the input converter 2.

Figure 3:
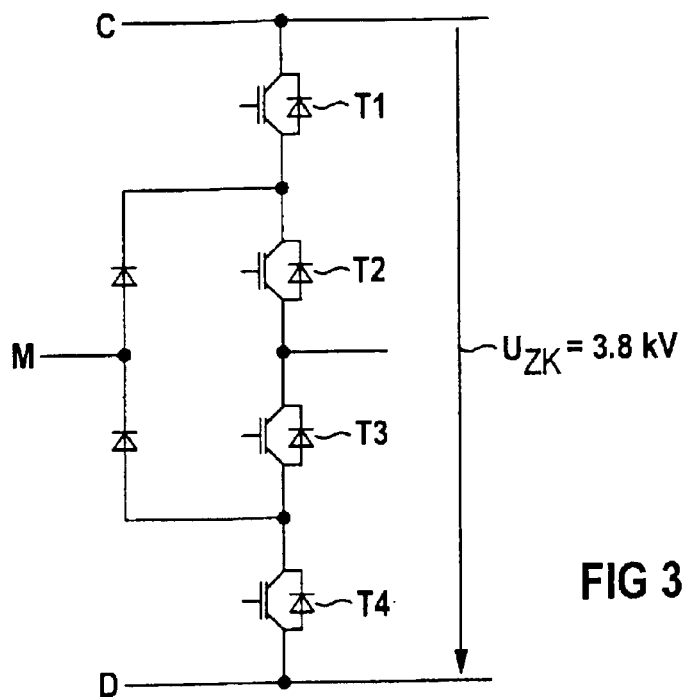
FIGS. 3–5 each illustrate one phase module of a machine converter of a voltage intermediate circuit converter with 1, 2 and 3 items connected in series.

FIG. 3 shows a phase module of the machine converter 14, which has four active converter devices T1, T2, T3 and T4 using three-point switching. Each active converter device T1 to T4 has only one semiconductor switch, in particular an HV-IGBT. The number of series connected items in this embodiment is therefore one. This phase module can accommodate a maximum DC voltage $U_{ZK}$ of 3.8 kV between its DC potentials C and D. This DC voltage $U_{ZK}$ is produced by the input converter 2. Since the two converter elements $4_1$ and $6_1$ are identical and are connected electrically in series on the DC-side, each converter element $4_1$ and $6_1$ produces half the intermediate circuit voltage $U_{ZK}$, amounting to 1.9 kV. However, since the phase module has twice the withstand voltage, low blocking-capability semiconductor switches can be used, in comparison to the phase module of the machine-side three-point pulse-controlled converter 14. These low blocking-capability HV-IGBTs can be operated at a higher switching frequency, or at a higher current level.

Figure 4:
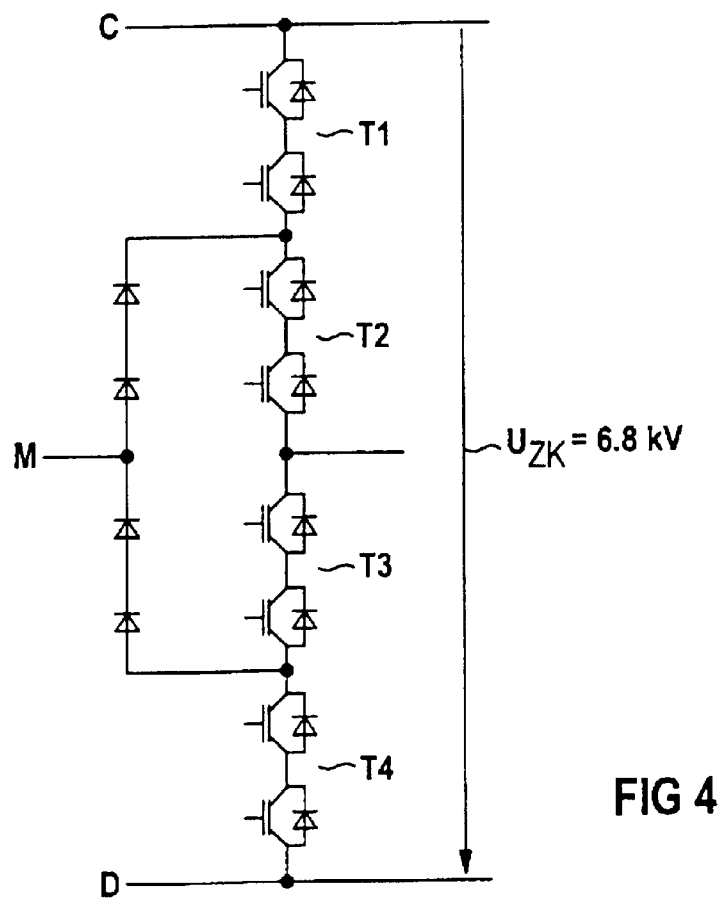

FIG. 4 shows a phase module, whose active converter devices T1 and T4 each have two semiconductor switches, in particular HV-IGBTs. In this case, the number of items connected in series is two (2). A maximum DC voltage $U_{ZK}$ of 6.8 kV can occur between the DC potentials C and D. In a voltage intermediate circuit converter as shown in FIG. 1, and having an input converter 2 according to the invention, the phase modules of the machine-side three-point pulse-controlled converter 14 are designed as shown in FIG. 4, and the phase modules of the converter elements $4_1$ and $6_1$ in the input converter 2 are designed as shown in FIG. 3.

Figure 5:
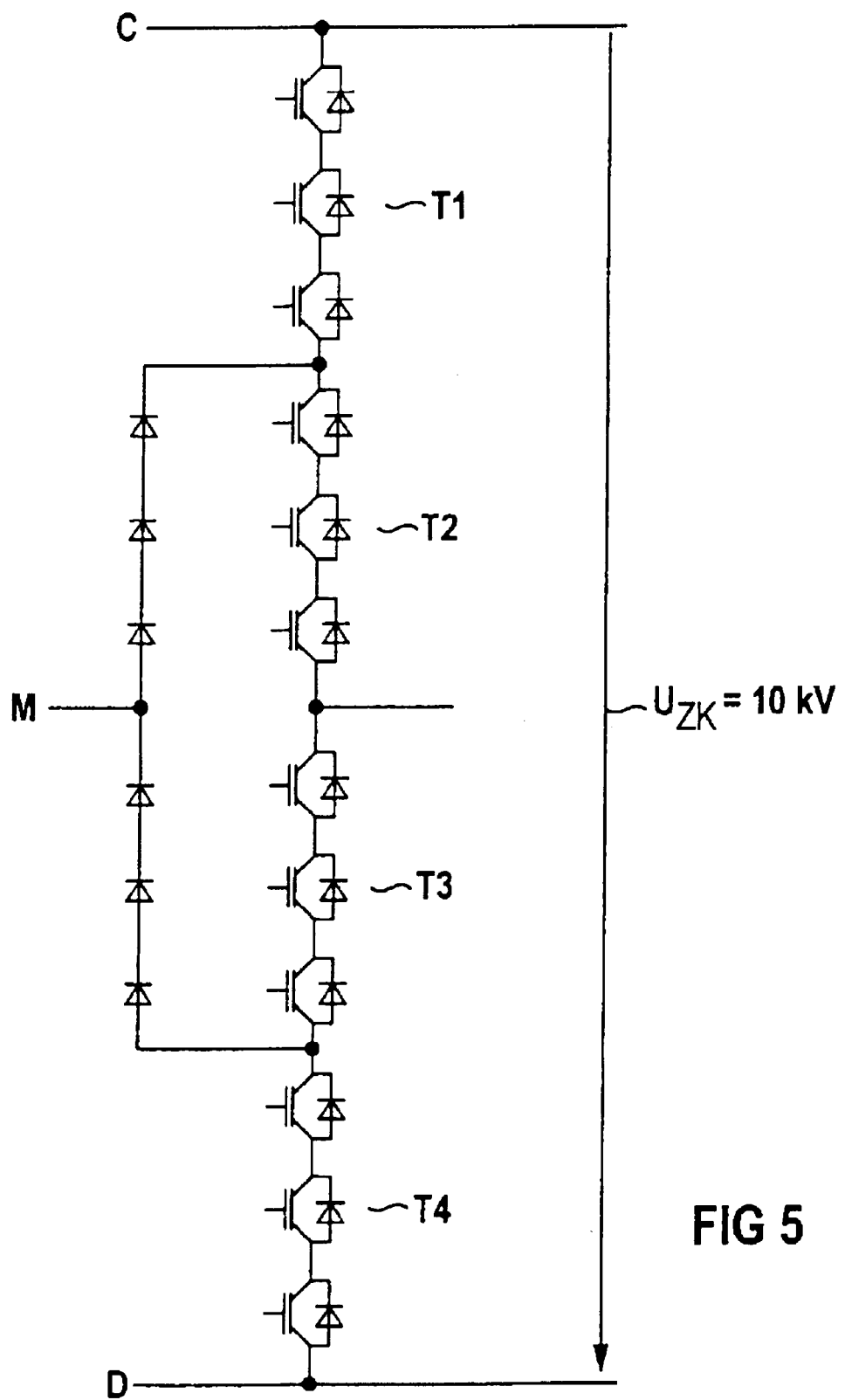

FIG. 5 shows a phase module in which the active converter devices T1 to T4 each have three semiconductor switches, in particular HV-IGBTs. The number of these active converter devices connected in series is three. In this phase module, with three items connected in series, it is possible for a maximum DC voltage $U_{ZK}$ of 10 kW to be dropped between or across the potentials C and D. In a voltage intermediate circuit converter for a standard medium voltage of 6 kV, the phase modules of the machine converter 14 are designed as shown in FIG. 5, and the phase modules of the converter elements $4_1$ and $6_1$ in the input converter 2 are designed as shown in FIG. 4.

The number of items connected in series in the converter elements $4_1$ and $6_1$ in comparison to the number of items connected in series in the machine converter 14 is thus one less beyond a standard medium voltage of 3.3 kV. The phase modules of the converter elements $4_1$ and $6_1$ are therefore less complex than the phase modules in the machine converter 14. In a voltage intermediate circuit converter for the medium voltage of 4.16 kV, the number of semiconductor switches in the two converter elements $4_1$ and $6_1$ in the input converter 2 is equal to the number of semiconductor switches in the input converter 2 in the active front end embodiment. This means that, 5th, 7th, 17th and 19th harmonics are eliminated just by the circuitry, and without having to increase the number of semiconductor switches.

What is claimed is:

1. A voltage intermediate circuit converter comprising a 12-pulse input converter having two converter elements, a voltage intermediate circuit having two capacitors connected electrically in series, and a machine-side three-point pulse-controlled converter, wherein the two converter elements are electrically conductively connected on a DC-side to a capacitor in the voltage intermediate circuit, and wherein the converter elements have a self-commutated pulse-controlled converter.

2. The voltage intermediate circuit converter according to claim 1, wherein the self-commutated pulse-controlled converters are each three-point pulse-controlled converters.

3. The voltage intermediate circuit converter according to claim 1, wherein each capacitor in the voltage intermediate circuit is split, with one capacitor being associated with the machine-side three-point pulse-controlled converter, and two capacitors being associated with a pulse-controlled converter in the input converter.

4. The voltage intermediate circuit converter according to claim 1, further comprising a number of series-connected active converter devices in the self-commutated pulse-controlled converters in the input converter and a number of series-connected active converter devices in the machine-side three-point pulse-controlled converter, said number of active converter devices in the self-commutated pulse-controlled converter being equal to the number of active converter devices in the machine-side three-point pulse-controlled converter.

5. The voltage intermediate circuit converter according to claim 4, wherein the number of series-connected active converter devices in the self-commutated pulse-controlled converters in the input converter is one less than the number of series-connected active converter devices in the machine-side three-point pulse-controlled converter.

6. The voltage intermediate circuit converter according to claim 4, wherein high-voltage insulated gate bipolar transistors are provided as active converter devices of the self-commutated pulse-controlled converters in the input converter and in the machine-side three-point pulse-controlled converter.

* * * * *